United States Patent

[11] 3,634,012

| | | |
|---|---|---|
| [72] | Inventor | Rudolf Mustert<br>Brunnenmattstrasse 6, Oberwil/Zug, Switzerland |
| [21] | Appl. No. | 28,443 |
| [22] | Filed | Apr. 14, 1970 |
| [45] | Patented | Jan. 11, 1972 |
| [32] | Priority | Apr. 16, 1969 |
| [33] | | Switzerland |
| [31] | | 5724/69 |

[54] METHOD AND APPARATUS FOR EXAMINING INTAGLIO PRINTING
9 Claims, 4 Drawing Figs.

[52] U.S. Cl. ............................................. 356/71,
250/219, 356/211, 356/212
[51] Int. Cl. ............................................. G06k 5/00
[50] Field of Search ............................................. 250/219
DQ; 356/71, 120, 209–212

[56] References Cited
UNITED STATES PATENTS
| 2,951,164 | 8/1960 | Timms .......................... | 356/71 X |
| 3,457,421 | 7/1969 | Bayha .......................... | 356/71 X |

Primary Examiner—Ronald L. Wibert
Assistant Examiner—F. L. Evans
Attorney—Morgan, Finnegan, Durham & Pine

ABSTRACT: An optical technique for examining a printed surface to ascertain if it has been printed in accordance with an intaglio printing process, wherein a portion of the embossed printed surface is alternately illuminated in directions longitudinal with and transverse to the embossed surface, the reflected light is detected by light-sensitive devices and the responses of the devices are compared to establish the authenticity of the printed surface.

PATENTED JAN 11 1972         3,634,012
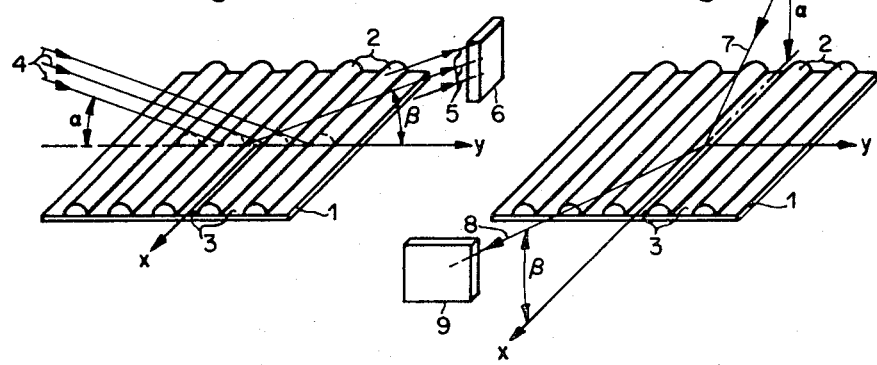
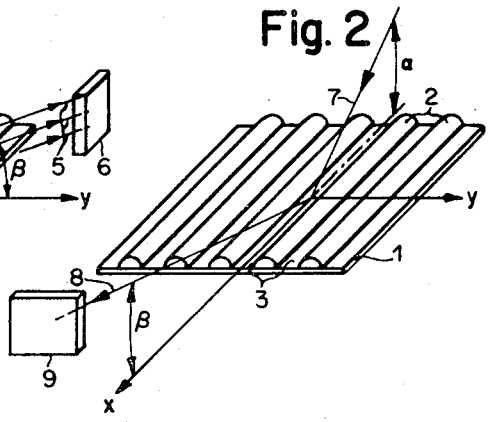
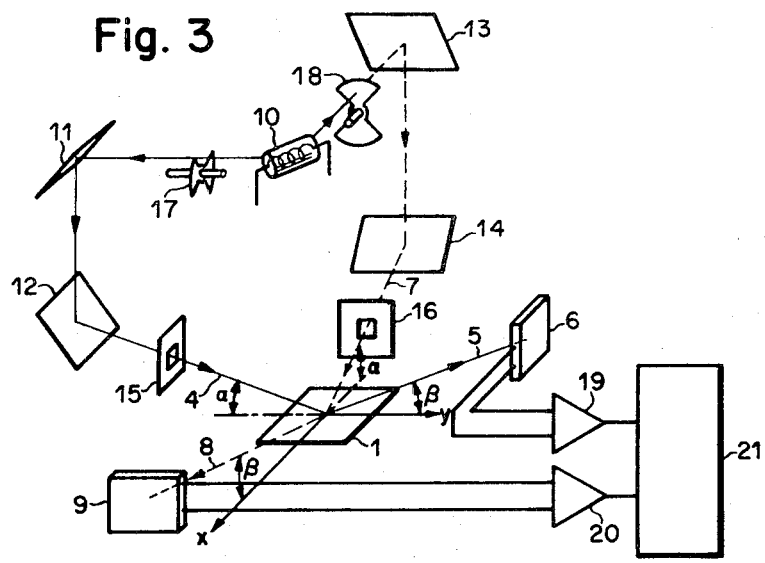
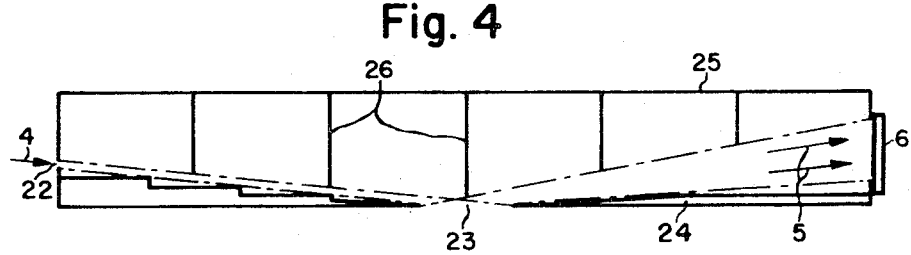

METHOD AND APPARATUS FOR EXAMINING INTAGLIO PRINTING

BACKGROUND OF THE INVENTION

The invention concerns a method and an apparatus for examining intaglio printing, in particular for testing the authenticity of banknotes and other paper money.

For the purpose of testing the authenticity of banknotes, it is known to shine light on selected points thereof, and to measure the reflected light or the light allowed through by the banknote, by means of light-sensitive cells. In automatic change or sales machines, the measuring result is evaluated for the accept or reject decision.

Banknotes generally have points which are produced using the steel engraving or copper engraving intaglio printing method, and which are missing in most forgeries. A particular characteristic of printing produced using the intaglio method is the heavier inking. This causes embossed differences in height between printed and unprinted points, so that for example a lined sample made by intaglio printing has an embossed hill-and-valley structure. The differences in height can be used to examine the intaglio printing.

Methods are known in which the differences in height between the surface of the paper and the printing are sensed mechanically. The sensing element used is a needle provided with a fine point, the lift of the needle which is controlled by the differences in height, being evaluated. Disadvantages of mechanical sensing are its sensitivity to vibration, the danger of the needle being fouled by printing ink rubbed off the paper, and the resulting damage to the print, which damage is cumulative when frequent sensing is carried out.

In accordance with the invention, the above-indicated disadvantages are eliminated in that a part of the surface of the article to be tested, which has an optical preferential direction, is illuminated at a small angle of light incidence successively in the direction of minimum shadow casting and in the direction of maximum shadow casting. The reflected light is measured photoelectrically at a small measuring angle and that the two measured values are compared together.

Points which exhibit hatching are particularly suited for examining intaglio printing in accordance with the above method. Almost all banknotes include points of that nature. In this case the light is shined in the longitudinal direction and in the transverse direction relative to the hatching.

An apparatus for carrying out the method according to the invention is characterized by at least one light source for the successive illumination of the portion of the surface in the directions of the minimum and the maximum shadow casting, by at least one light-sensitive cell for measuring the reflected light, and by an evaluation means for comparing the two measured values and for the yes-no decision.

BRIEF DESCRIPTION OF THE DRAWINGS

An illustrative embodiment of the invention is described in the following detailed specification which includes the following drawings and wherein:

FIG. 1 is a diagrammatic drawing illustrating examination by light shined in the transverse direction, FIG. 2 is a diagrammatic drawing illustrating examination by light shined in the longitudinal direction, FIG. 3 is a diagram of the apparatus for testing the light from the intaglio surface; and FIG. 4 is a detailed drawing illustrating a portion of FIG. 3.

In FIG. 1, reference 1 denotes a highly magnified portion of a hatched surface of a banknote produced by a metal engraving intaglio printing method. Intaglio printing hatching 2 is formed by elongated, relieflike raised portions of dark printing ink. The longitudinal direction of the hatching 2 is indicated by $x$, while the transverse direction thereof is indicated by $y$. The lighter paper appears at the valley floor 3. A light beam 4 falls at a small angle of incidence $\alpha$ onto the portion 1 of the banknote and illuminates the hatching 2 in the transverse direction $y$. A part of the reflected light beam 5 falls on a light-sensitive cell 6 which is arranged at a small average measuring angle $\beta$ above the portion 1, of the banknote.

It follows from the geometry of the above-described measuring arrangement that when the angles $\alpha$ and $\beta$ are sufficiently small, very little light falls on the light-sensitive cell 6, as only the shadow side of the hatching 2 but not the bright valley floor 3 can be observed from the location of cell 6.

If on the other hand the portion 1 of the banknote is illuminated as shown in FIG. 2 with a light beam 7 in the longitudinal direction $x$, and the reflected light beam 8 is again measured at a small measuring angle $\beta$ by means of a light-sensitive cell 9, the entire length of the bright valley floor 3 is visible to the cell 9, that is to say, considerably more light falls on the cell 9 than on the cell 6. Accordingly, the intaglio hatching 2 can be examined optically if the light strengths measured by the cells 6 and 9 are compared.

The optimum value of the angle $\alpha$ of light incidence and the measuring value $\beta$ depends on the nature of the banknote to be tested. Experiments have shown that the angle $\alpha$ of light incidence and the measuring angle $\beta$ are preferably less than 6°. Taking this rule into account, an average ratio between the two measurement values of about 1:2 was found on various banknotes produced by a metal-engraving intaglio-printing method. In the case of forged notes produced using another printing method, which did not have the characteristic hill-and-valley structure, the two values scarcely differed.

So as to ensure that the above-described method can be reproduced, it must be ensured that the test surface is completely flat and that the surroundings are as free from reflection as possible. A sharply defined part of the surface of the intaglio printing hatching to be examined is preferably illuminated.

FIG. 3 shows a diagram of the principle of an apparatus for carrying out the above-described method. The same parts as in FIGS. 1 and 2 are provided with the same reference numerals. The light rays 4 and 7 issue from a light source 10 which is arranged vertically above the portion 1 of banknote, are twice deflected by mirrors 11 to 14 and pass through shutter screens 15, 16 to fall at the prescribed angle on the portion 1 of banknote, and from there pass to the light-sensitive cells 6, 9. Depending on the position of sector shutters 17, 18 either the light beam 4 or the light beam 7 is allowed to pass. The light-sensitive cells 6, 9 are connected by way of respective amplifiers 19, 20 to an evaluation means 21 for comparison of the two measurement values and for the yes-no decision.

If the path of the light beams 4 and 7 is alternately periodically opened by the sector shutters 17, 18, the light-sensitive cells 6, 9 produce a series of electrical pulses, the mean voltage values of which can be formed and compared together.

Obviously, the intaglio hatching can also be illuminated in the longitudinal direction $x$ and in the transverse direction $y$ by means of two separate light sources. In this case, however, there is the danger that these light sources present different aging phenomena so that the result of the measurements is falsified.

Instead of the cells 6 and 9, a single light-sensitive cell can be used, the light beams 5 and 8 being projected on to the single cell by way of a system of mirrors. Other advantageous possibilities are arranging a single light source and/or a single light-sensitive cell on an arm which is pivotable through 90° or rotating the test article itself through 90°.

FIG. 4 shows the form of the light tunnel which has an inlet aperture 22 for the light beam 4, and the light-sensitive cell 6 for the photoelectric measurement of the reflected light beam 5. Normal to the plane of the drawing, this light tunnel has a similar light path for the light beams 7, 8. An aperture 23 is formed in a baseplate 24 against which the banknote to be tested is pressed. To eliminate stray light, the baseplate 24, the thickness of which may not fall below a certain minimum measurement for strength reasons, is provided with steps. A closure place 25 which comprises projecting shutters 26, limits the light beams 4 and 5 upwardly and at the same time prevents stray light reaching the light-sensitive cell 6 by way of the closure cover 25.

As already mentioned, other points besides hatching, which have an optical preferential direction, such as for example lined specimens and the like, are also suitable for examining intaglio printing in accordance with the method of the invention.

The above-described method for examining a surface structure with an optical preferential direction can also be used in the testing of material, for example for examining knurling and a metal surface.

Instead of light reflection, obviously the reflection of other physical quantities, waves or radiations of any type can also be used.

What is claimed is:

1. A method of examining for intaglio printing a surface, a portion of said surface being characterized by ridges and by valleys therebetween and therefore having an optically preferred direction, comprising the steps of:
   illuminating said portion at a small angle of light incidence $\alpha$ alternately in a direction approximately transverse to said ridges and in a direction approximately parallel to said ridges;
   measuring the light alternately reflected from said portion in said directions transverse to and parallel to said ridges at a small average angle $\beta$ of light reflection; and
   comparing the alternate measurements.

2. A method according to claim 1 wherein said angle of light incidence $\alpha$ and said angle of light reflection $\beta$ are less than approximately 6°.

3. A method according to claim 1 wherein said portion is hatched and said illuminating is alternately in the longitudinal direction and in the transverse direction.

4. A system for examining for intaglio printing a surface, a portion of said surface being characterized by ridges and valleys therebetween and therefore having an optically preferred direction, comprising:
   means for illuminating said portion at a small angle of light incidence $\alpha$ alternately in a direction approximately transverse to said ridges and in a direction approximately parallel to said ridges;
   light-responsive means for detecting the light alternately reflected from said portion in said directions transverse to and parallel to said ridges
   said light-responsive means positioned at a small average angle of light reflection $\beta$,
   said light-responsive means producing output signals in accordance with said reflected light; and
   evaluation means operably connected to said light-responsive means and responsive to said output signals for developing an indication of said surface.

5. A system according to claim 4 wherein said angle of light incidence $\alpha$ and said angle of light reflection $\beta$ are less then approximately 6°.

6. A system according to claim 4 wherein said illuminating means includes means for substantially excluding ambient light from said illuminated portion.

7. A system for examining for intaglio printing a surface, a portion of said surface being characterized by ridges and by valleys therebetween and therefore having an optically preferred direction, comprising:
   a single source of light;
   reflective means for directing said light for illuminating said portion at a small angle of light incidence $\alpha$
   in a direction approximately transverse to said ridges,
   in a direction approximately parallel to said ridges;
   means for interrupting said light so as to illuminate said portion alternately in said directions transverse to and parallel to said ridges;
   light-responsive means for detecting the light alternately reflected from said portion,
   said light-responsive means at a small average angle of light reflection $\beta$,
   said light-responsive means producing output signals in accordance with said reflected light; and
   evaluation means connected to said light-responsive means and responsive to said output signals for developing an indication of said surface.

8. A system according to claim 7 wherein said angle of light incidence $\alpha$ and said angle of light reflection $\beta$ are less than approximately 6°.

9. A system according to claim 7 in which said output signals are approximately in the ratio of 2:1.

* * * * *